United States Patent [19]

Hamada

[11] 4,227,595
[45] Oct. 14, 1980

[54] CURRENT TRANSMITTING SYSTEM FOR ELECTRICAL VEHICLE

[75] Inventor: Mitsuharu Hamada, Yokohama, Japan

[73] Assignee: Nissan Motor Company, Limited, Japan

[21] Appl. No.: 48,377

[22] Filed: Jun. 14, 1979

[30] Foreign Application Priority Data

Sep. 7, 1978 [JP] Japan ................. 53-109102

[51] Int. Cl.³ .................... B60L 1/00; B60L 9/00
[52] U.S. Cl. ......................... 191/2; 180/167; 191/15; 191/31
[58] Field of Search ............... 191/2, 3, 6, 7, 15, 191/22 R, 31; 180/167, 168

[56] References Cited

U.S. PATENT DOCUMENTS 2,554,248  5/1951  Hibbard ................. 191/2 X

FOREIGN PATENT DOCUMENTS 39228  3/1977  Japan ................. 180/167

Primary Examiner—Richard A. Schacher
Attorney, Agent, or Firm—Lane, Aitken, Ziems, Kice & Kananen

[57] ABSTRACT

A current transmitting system for use with a self-propelled automatically steered electric vehicle includes a pair of parallel, circularly arranged bus bars connected to a low-frequency A.C. power source, an induction cable extending along the bus bars and connected to a high-frequency A.C. power source, and a current collecting shoe slidable on and along each of the bus bars for transmitting the current carried by the bus bar to an electric device mounted in the vehicle. In this system, each of the bus bars is divided into two sections one of which is connected to the low-frequency A.C. power source through a coil.

1 Claim, 9 Drawing Figures

CURRENT TRANSMITTING SYSTEM FOR ELECTRICAL VEHICLE

FIELD OF THE INVENTION

The present invention relates in general to a self propelled automatically steered electric vehicle which runs on and along a trackway by collecting current from bus bars extending along the trackway and more particularly to a current transmitting system for transmitting the current from the bus bars to the vehicle without affecting the automatic steerability of the vehicle.

OBJECTS OF THE INVENTION

It is an object of the invention to provide an improved lay-out of a bus bar unit for a self-propelled automatically steered electric vehicle, the lay-out being constructed not to affect the automatic steerability of the vehicle.

It is another object of the invention to provide an improved lay-out of a bus bar unit which can be constructed by only slightly modifying a conventional lay-out.

It is still another object of the present invention to provide a current transmitting system for use with a self-propelled automatically steered electric vehicle, which includes a pair of parallel, circularly arranged bus bars connected to a low-frequency A.C. power source, an induction cable extending along the bus bars and connected to a high-frequency A.C. power source, and current collecting means slidable on and along each bus bar to transmit the current carried by the bus bar to an electric device mounted in the vehicle, wherein each of the bus bars is divided into two sections one of which is connected to the low-frequency A.C. power source through a coil.

Other objects and advantages of the present invention will become apparent from the following description when taken in conjunction with the accompanying drawings.

OUTLINED DESCRIPTION OF A SELF-PROPELLED AUTOMATICALLY STEERED ELECTRIC VEHICLE

Prior to describing in detail the improved current transmitting system of the invention, outlined explanation of a self-propelled automatically steered electric vehicle now in use to which the system of the invention is applicable will be made with reference to FIGS. 1 to 4B of the accompanying drawings.

Figure 1:
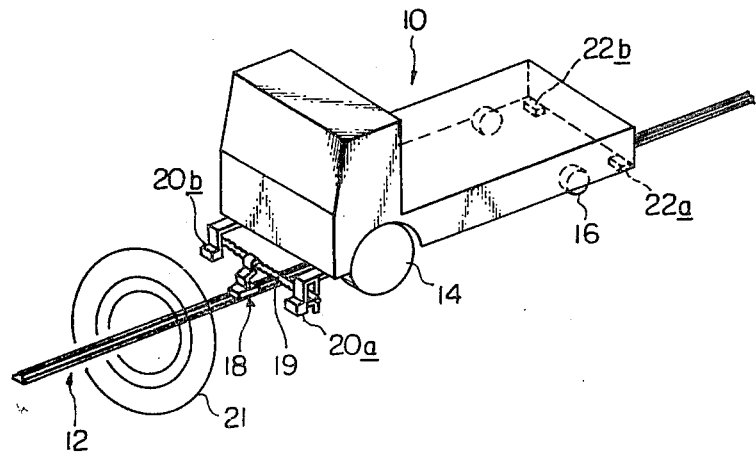
FIG. 1 is a perspective view of an electric self-propelled vehicle to which an improved current transmitting system according to the invention is applicable.
Figure 2:
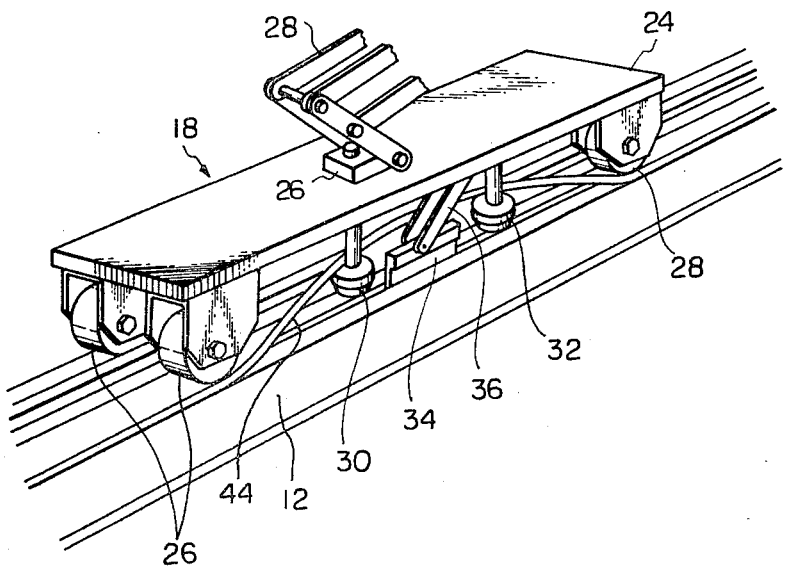
FIG. 2 is a perspective view of a current collector unit employed in the vehicle of FIG. 1.

Referring to FIG. 1, there is shown an example of a self-propelled vehicle 10 which is designed to run on and along a trackway by collecting current from a bus bar unit 12 built along the trackway. The vehicle 10 generally comprises a front wheel unit 14 steerably mounted on the front section of the vehicle 10, a rear wheel unit 16 mounted on the rear section of the vehicle 10, and a current collector unit 18. As shown, the wheel units 14 and 16 are arranged to straddle over the bus bar unit 12 so that the vehicle 10 runs along the bus bar unit 12. The current collector unit 18, the construction of which is clearly shown in FIG. 2, is connected via a later-mentioned universally rotatable link mechanism and a sliding rod 19 to the front section of the vehicle 10 for the purpose of collecting current from the bus bar unit 12, more specifically, from bus bars (52) equipped in the unit 12. A known electric motor (not shown) is mounted in the vehicle 10 for propelling the same upon energization by receiving the current from the collector unit 18. Detectors or sensors 20a, 20b, 22a and 22b are fixed to the front and rear corner sections of the vehicle 10 for detecting magnetic field 21 provided by a later-mentioned induction cable (54) equipped in the bus bar unit 12. The detectors 20a and 20b operate when the vehicle 10 runs forward, that is in the leftward direction of the drawing, while the detectors 22a and 22b operate when the vehicle 10 runs backward. Although not shown, a known control unit is equipped in the vehicle 10 to control the steering mechanism of the vehicle 10 in such a manner that the paired detectors such as 20a and 20b or 22a and 22b can always detect equal intensity of the magnetic field produced by the induction cable 54.

Referring to FIG. 2, there is shown the current collector unit 18 mounting on the bus bar unit 12. The collector unit 18 hereinshown comprises a base plate 24 which has on the middle section thereof a ball joint 26 from which a pantographical link 28 extends for universally rotatable connection between the current collector unit 18 and the sliding rod 19. Two front vertical rollers 26 are connected via respective brackets (no numerals) to the front section of the base plate 24, while two rear vertical rollers 28 are connected via respective brackets to the rear section of the base plate 24. Two front horizontal and two rear horizontal rollers 30 and 32 are connected via respective shafts (no numerals) to the base plate 24 at a position between the front and rear vertical rollers 26 and 28. As will become more apparent hereinafter, the vertical rollers 26 and 28 run on lid portions 44 of the bus bar unit 12, forcedly closing the lid portions, while the horizontal rollers 30 and 32 run to open the lid portions 44. Two collecting shoes 34 are connected via respective linkages 36 and biasing means such as springs (not shown) to the base plate 24 at positions between the front and rear horizontal rollers 30 and 32 so that the shoes 34 are biased downward in the drawing.

Figure 3:
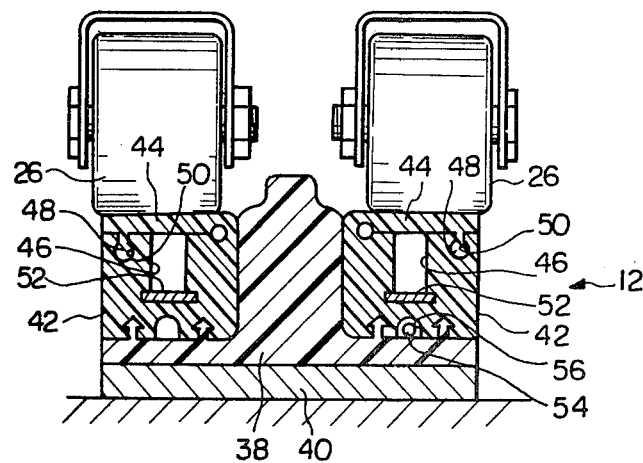
FIG. 3 is a cross-section view of a bus bar unit on which vertical rollers of the current collector unit of FIG. 2 run.

Referring to FIG. 3, there is shown the bus bar unit 12 on which the above-mentioned current collector unit 18 runs. The bus bar unit 12 comprises a mount 38 having an upside-down, generally T-shaped cross-section. The mount 38 is laid via a spacer 40 on the trackway with the two opposingly extending flange sections (no numerals) thereof down, as shown. Two insulating receptacles or bus bar containers 42 are lockingly mounted on the respective flange sections of the mount 38 and extend along the same. Each receptacle 42 is provided with a hinged lid portion 44 which has an area to sufficiently close a groove 46 of the receptacle 42. The free end of each lid portion 44 is formed at the back surface thereof with a headed ridge 48 and each receptacle 42 is formed, at a section engageable with the ridge 48, with a slit 50 having an enlarged lower section. The headed ridge 48 is sealingly and lockably received in the slit 50, for tight covering of the lid portion 44 to the groove 46, when the lid portion 44 is pressed against the corresponding receptacle 42 by the vertical rollers 26 and 28 of the current collector unit 18. Within each groove 46 is received a bus bar or current carrying cable which extends along each receptacle 42. Within one of the receptacles 42 is received an induction cable 54 which also extends along the same. For this, a slit 56 is formed in each receptacle 42 at a position below the groove 46.

Figure 4A:
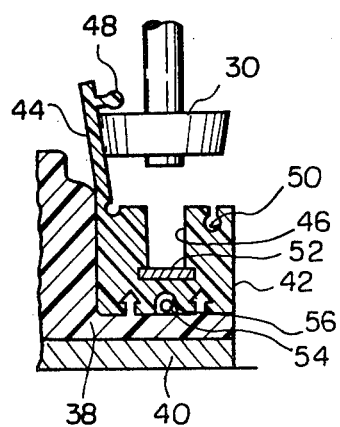
FIG. 4A is a partial sectional view of a bus bar unit with its lid portion opened by a horizontal roller of the current collector unit of FIG. 2.
Figure 4B:
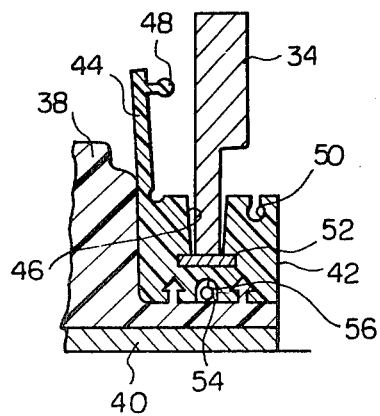
FIG. 4B is a partial sectional view of a bus bar unit with its bus bar proper, which a current collecting shoe of the current collector unit of FIG. 2 slidingly contacts.

As is understood from FIGS. 2, 3 and 4A, each of the horizontal rollers 30 or 32 of the current collector unit 18 functions to hold each lid portion 44 partially but progressively open under running, while each of the vertical rollers 26 and 28 functions to press the lid portion 44 against the receptacle 42 to close the groove 46. As is clear from FIGS. 2 and 4B, each of the collecting shoes 34 is received in the partially exposed groove 46 of the receptacle 42 to be brought into sliding contact with the bus bar 52, the partially exposed groove being made by the horizontal rollers 30 and 32 as has been explained above.

With this, the current carried by each bus bar 52 can be transmitted to the electric motor of the vehicle 10 for running the same. At running of the vehicle 10, the paired detectors 20a and 20b or 22a and 22b on the vehicle 10 continue detecting the intensity of the magnetic field produced by the induction cable 54 so that the vehicle 10 is automatically steered to take a given way, more specifically, that the steering mechanism connected to the front wheel unit 14 is such controlled that the paired detectors are caused to detect equal intensity of the magnetic field 21 continuously.

LAY-OUTS OF BUS BAR UNITS WHICH HAVE BEEN PROPOSED

The following description is concerned with lay-outs of looped bus bar units which have been proposed or thought about.

Figure 5:
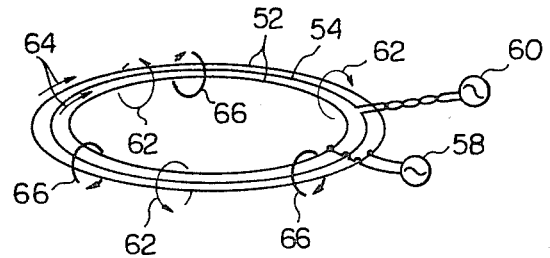
FIG. 5 is a sketch showing a lay-out composed of looped bus bars and a looped induction cable.

In FIG. 5, an example of the lay-outs is shown in which the bus bars 52 and the induction cable 54 are schematically illustrated. A low-frequency A.C. power source 58, such as a power source producing, for example, electricity of 200 V, 50 Hz is connected via leads to the bus bars 52 and a high-frequency A.C. power source 60 such as an induction oscillator generating, for example, high-frequency electricity of 9 KHz is connected to the induction cable 54 in the disclosed manner. However, in this lay-out, a drawback arises, that is, the magnetic field 21 (see FIG. 1) produced by the induction cable 54 will cause generation of an induced electromotive force in the looped bus bars 52 which reduces the intensity of the magnetic field 21 remarkably.

The reason why the above-mentioned reduction occurs will be explained. As is known, application of the high-frequency current to the induction cable 54 causes generation of a magnetic field thereabout which reverses in direction with the equal period to the applied current. Now, for easy understanding of the explanation, the following description will start with respect to a momentary condition wherein the current applied to the cable 54 flows in the direction to produce a magnetic field 21 having the direction indicated by thin arrows 62. Under this, an induced electromotive force is generated in each of the bus bars 52, producing a reversed current 64 flowing in the bus bar 52 with the equal frequency to the high-frequency current applied to the cable 54. The occurrence of the reversed current in each bus bar 52 will cause generation of another magnetic field, indicated by thick arrows 66, about the bus bar 52, the field having the opposite direction to the field 62. The magnetic field 66 thus provided will cancel or at least lower the original field 62, so that sufficient magnetic field for guiding the vehicle 10 cannot be provided by the induction cable 54.

A method for solving the above problem is to keep the induction cable 54 away from the bus bars 52 to such an extent that the magnetic field produced by the induction cable 54 fails to reach the bus bars 52. However, in this case, not only the overall construction of the bus bar unit 12 becomes bulky, but also the cost of construction becomes great. Thus, this method is not practical.

Figure 6:
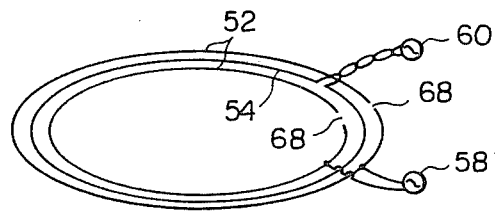
FIGS. 6 and 7 are sketches similar to FIG. 5, but show other lay-outs.

FIG. 6 shows another proposed lay-out in which each bus bar 52 is cut off at a section 68. However, in this case, a closed loop of each bus bar 52 is unavoidably formed, even though in a moment, when the collecting shoes 34 reach the cut out sections 68 to bridge therebetween under cruising of the vehicle 10. Thus, complete solution for the above problem is not expected by this method.

Figure 7:
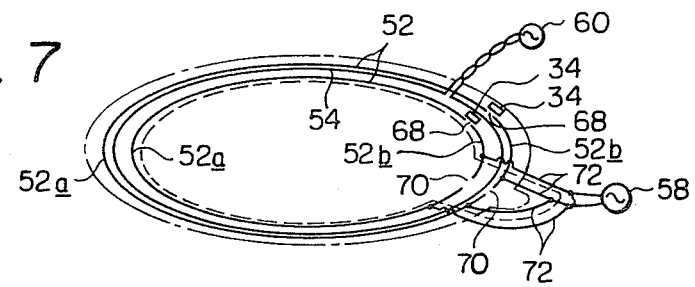

FIG. 7 shows a still another lay-out similar to that of FIG. 6, in which each bus bar 52 is cut off at two sections 68 and 70 to form first and second sections 52a and 52b thereof, the first and second sections 52a and 52b being independently connected via leads 72 to the power source 58 in a manner as shown in the drawing. However, also in this case, the following drawback will inevitably occur, that is, when each collecting shoe 34 of the current collector unit 18 comes to one of the cut out sections 68 and 70 in a manner as shown, a closed loop consisting of each bus bar 52 and the leads 72 is formed as is indicated by broken and phantom lines, thereby causing the drop of the magnetic field intensity of the induction cable 54.

DESCRIPTION OF THE EMBODIMENT

Therefore, an essential object of the present invention is to solve the above-mentioned problem. As will be understood from the following, the present invention is provided by taking into a practical use a physical fact in which a coil offers higher resistance to high-frequency current but less resistance to low-frequency current.

Figure 8:
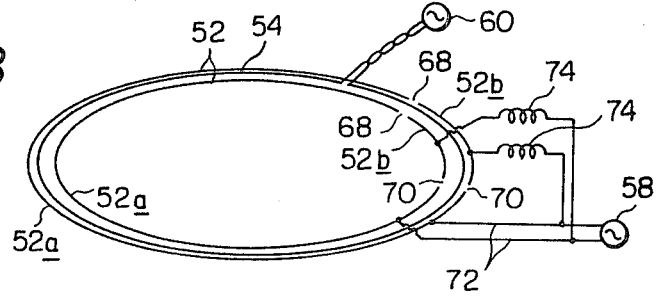
FIG. 8 is a sketch also similar to FIG. 5, but shows an improved lay-out embodying the present invention.

FIG. 8 shows the embodiment of the lay-out of the invention. Similar parts to the before-mentioned ones will be designated by the same numerals as those in FIG. 7.

Similarly to the case of FIG. 7, each of the bus bars 52 is cut off at two sections 68 and 70 to form first and second sections 52a and 52b. The first sections 52a of the bus bars 52 are connected through leads 72 to the low-frequency A.C. power source 58, while the second sections 52b are connected to the source 58 through induction coils 74, as shown. Each coil 74 has, for example, the inductance of 120 μH in this embodiment.

Now, in this embodiment, the impedance Z of each coil 74 provided against the applied current having the frequency of 50 Hz will be represented as follows:

$$Z = 2\pi fL = 0.037 \Omega \qquad (1)$$

Thus, under sliding of each collecting shoe 34 on the second section 52b of the bus bar 52, transmitting of current to the electric motor of the vehicle 10 can be made with negligible reduction in intensity of the current. In this instance, the closed loop of each bus bar 52 is not provided due to electrical isolation of the first and second sections 52a and 52b. Of course, the running of the vehicle 10 along the first section 52a of the bus bars 52 is assuredly made without obstructions. Now, when each collecting shoe 34 reaches one of the cut off sections 68 and 70, in a manner as shown in FIG. 7, and connects the first and second sections 52a and 52b, the above mentioned closed loop consisting of each bus bar 52, the lead 72 and each coil 74 is formed. However in this case, the reversed current (64 see FIG. 5) induced by the current from the high-frequency A.C. power source or oscillator 60 which offers the electricity of 90 KHz is remarkably reduced in intensity by the provision of each induction coil 74. In fact, in such case, the impedance Z of each coil 74 becomes large as is understood from the next equation:

$$Z = 2\pi fL = 6.78 \Omega \qquad (2)$$

With the above, it will be appreciated that even when the closed loop for generation of reversed current is formed in each bus bar 52 during running of the current collector unit 18 along the bus bar unit 12, the reversed current fails to produce the reversed magnetic field having intensity to considerably obstruct the magnetic field 21 primarily provided by the induction cable 54. Thus, the detectors 20a, 20b, 22a and 22b on the vehicle 10 can operate optimally for guiding the vehicle 10.

What is claimed is:

1. In a current transmitting system, for use with a self-propelled automatically steered electric vehicle, including a pair of parallel, circularly arranged bus bars connected to a low-frequency A.C. power source; an induction cable extending along said bus bars and connected to a high-frequency A.C. power source; and current collecting means slidable on and along each of said bus bars for transmitting the current carried by said bus bar to an electric device mounted in said vehicle, the improvement in that each of said bus bars is divided into two sections which are isolated from each other, one of said sections being connected to said low-frequency A.C. power source through a coil.

* * * * *